(12) United States Patent
Morse et al.

(10) Patent No.: US 9,412,086 B2
(45) Date of Patent: Aug. 9, 2016

(54) APPARATUS AND METHOD FOR CUSTOMIZED PRODUCT DATA MANAGEMENT

(71) Applicants: Bradd A. Morse, Owego, NY (US); Melissa K. Dobson, Owego, NY (US)

(72) Inventors: Bradd A. Morse, Owego, NY (US); Melissa K. Dobson, Owego, NY (US)

(*) Notice: Subject to any disclaimer, the term of this patent is extended or adjusted under 35 U.S.C. 154(b) by 62 days.

(21) Appl. No.: 13/789,645

(22) Filed: Mar. 7, 2013

(65) Prior Publication Data

US 2014/0252091 A1    Sep. 11, 2014

(51) Int. Cl.
| | |
|---|---|
| G06F 19/00 | (2011.01) |
| G06Q 30/00 | (2012.01) |
| G06Q 10/00 | (2012.01) |
| G06Q 10/08 | (2012.01) |
| F25D 29/00 | (2006.01) |

(52) U.S. Cl.
CPC .............. G06Q 10/087 (2013.01); F25D 29/00 (2013.01); *F25D 2500/06* (2013.01)

(58) Field of Classification Search
CPC ...... G06Q 10/08; G06Q 10/087; F25D 29/00; F29D 2500/06
USPC ............... 235/385, 375; 705/28, 22; 340/5.92
See application file for complete search history.

(56) References Cited

U.S. PATENT DOCUMENTS

| | | | |
|---|---|---|---|
| 6,483,695 | B1 | 11/2002 | Harstein |
| 6,513,017 | B1 | 1/2003 | Howard et al. |
| 7,065,501 | B1 | 6/2006 | Brown et al. |
| 7,404,298 | B2 | 7/2008 | Kim et al. |
| 7,492,973 | B2 | 2/2009 | Cato |
| 7,748,617 | B2 | 7/2010 | Gray |
| 7,930,221 | B2 | 4/2011 | Brown et al. |
| 8,042,346 | B2 | 10/2011 | Oh et al. |
| 8,538,829 | B1 * | 9/2013 | Hu et al. ................... 705/26.1 |
| 2002/0198795 | A1 * | 12/2002 | Dorenbosch .................. 705/28 |
| 2003/0107515 | A1 * | 6/2003 | Howard .................. 342/357.07 |
| 2005/0177387 | A1 | 8/2005 | Mojasa |
| 2005/0247782 | A1 * | 11/2005 | Ambartsoumian ........... 235/385 |
| 2008/0052037 | A1 * | 2/2008 | Bodin et al. .................. 702/173 |
| 2010/0275625 | A1 * | 11/2010 | Lowenstein .................... 62/127 |
| 2011/0062237 | A1 * | 3/2011 | Chaves ........................ 235/454 |
| 2011/0267174 | A1 * | 11/2011 | Davis ........................... 340/10.1 |
| 2011/0317008 | A1 | 12/2011 | Sam |
| 2012/0217254 | A1 | 8/2012 | Cho et al. |
| 2014/0006131 | A1 * | 1/2014 | Causey et al. .............. 705/14.24 |

* cited by examiner

*Primary Examiner* — Laura Gudorf
(74) *Attorney, Agent, or Firm* — Lambert & Associates; Gary E. Lambert; David J. Connaughton, Jr.

(57) ABSTRACT

The invention is an electronic identification system that integrates with consumer purchased products for management of data in digital form by way of an interconnected computing system, network, and/or mobile device. The system utilizes a scanning system and coded labels that facilitate a uniform identification of goods within a sales setting or within a household. Such a system would enable the use of SMART technology systems in household appliances, warehouses and retail such that the system implements mobile applications and interfacing through a high-speed network.

25 Claims, 9 Drawing Sheets

APPARATUS AND METHOD FOR CUSTOMIZED PRODUCT DATA MANAGEMENT

FIELD OF THE INVENTION

The present invention relates generally to the field of electronic systems, and more particularly, to an apparatus and method for electronic identification and management of good and/or services.

BACKGROUND OF THE INVENTION

A number of consumer products have been proposed to monitor food items and inventory in both household settings and retails use. Storage areas might include kitchen pantries, refrigerators, freezers, and storage areas that hold bulk supply. These storage areas have included monitoring systems that often utilize bar code scanners, electronic tag sensors, and other methods that manually read and detect the addition and removal of items within a particular storage area or areas by way of a handheld device. Other monitoring systems have provided for monitoring the temperature, humidity, and acidity of a food item in order to determine whether the food item is suitable for consumption. Specialized containers have been used to track the temperature and humidity exposure of the food in the containers.

The use of such monitoring systems, however, has been limited to maintaining a list of food items and their suitability for consumption. The systems do not manage the inventory according to preferred practices, nor does the inventory get automatically updated.

Most systems employ manual practices to date due to several factors including, but not limited to, the relatively mainstream acceptance of current barcode systems and handheld scanners in a consumer sales setting. This would include the Universal Product codes (known as UPC codes) that identify products on a store shelf, from food and beverage identification, to automotive products, entertainment and common everyday household products. Further, employment and shipping practices depend on the use UPC codes for delivery and stocking of items to ensure accurate inventory.

Typically, households have not utilized the barcode systems to track inventory within a home, nor has the option been available or even been presented as cost-effective. Further, listings of food items and other identifiable goods in a home have been absent in written or electronic form. On the other hand, quick response codes (QR codes) have been implemented for marketing and consumer, providing easily accessible information about most any product. The most common and popular use of QR codes is to display website information including a website address.

While conventional bar codes are capable of storing a maximum of approximately 20 digits, QR Code is capable of handling several hundred times more information. QR Code is capable of handling all types of data, such as numeric and alphabetic characters, Kanji, Kana, Hiragana, symbols, binary and control codes. Up to 7,089 characters can be encoded in one symbol. QR Code carries information both horizontally and vertically which enables it to encode the same amount of data in approximately $\frac{1}{10}^{th}$ the space of a traditional bar code. In Japanese, one full-width Kana or Kanji character is efficiently encoded in 13 bits allowing QR Code to hold 20% more data than other 2D symbologies. QR Code is also capable of 360 degree (omni-directional), high speed reading, through position detection patterns located at the corners of the symbol, guaranteeing high-speed reading and circumventing negative effects of background interference.

Where coding has provided access to internet through mobile networks, the availability of enhanced coding of consumer products, patent marks, and detailed easy-access information through existing appliances and inventory systems is lacking. The store owner lacks the apparatus or system that would enable automated detection, identification and tracking of a product from entry at delivery through to exit at purchase. Even moreso, the consumer market lacks any system of personalized product management, inventory, and information data system for easy access through internet or mobile application.

A need exists for an electronic identification system that would integrate with consumer purchased products for management of data in electronic form by way of an interconnected computing system, network, and/or mobile device. The system would utilize the benefits of current coding systems while also employing coding that will facilitate a uniform identification of goods within a sales setting or within a household. Such a system would enable the use of self-monitoring, analysis, and reporting technology systems (SMART systems) that implement apps and interfacing from a high-speed network. Future desirable systems would be integrated with household appliances, particularly to enable SMART refrigerators, freezers, and pantries that implement features that allow automated grocery list compilations based on volumes and weights of items entering and exiting the storage appliance, including nutritional facts, recipe listings, and expirational information. The appliance systems would also beneficially implement display technology that allows for an integrated flat panel computer technology on a surface of the appliance such that the surface is transparent to visualize items within the storage area, change to a functional computer system for easy file access on a hard drive or network, or perhaps create an image or transformational effect that implements a color-change or design that coordinates with the character of a room. Further needs will be realized as described in the following detailed description.

SUMMARY OF THE INVENTION

The present invention comprises an electronic identification system that addresses and resolves issues with organizing and managing products in consumer-based settings, household settings, industrial manufacturing, delivery/shipping, retail, and/or storage. The system integrates with coding of consumer purchased products for management of data in electronic form by way of an interconnected computing system, network, and/or mobile device. The system also employs coding that facilitates a uniform identification of goods such as through the use of microchips or 3D imaging codes. The system incorporates the use of self-monitoring, analysis, and reporting technology systems (SMART systems) that implement apps and interfacing through a high-speed network. The SMART systems are integrated with household appliances, particularly to enable SMART refrigerators, freezers, and pantries that implement features that allow automated grocery list compilations based on volumes and weights of items entering and exiting the storage appliance; information codes also include nutritional facts, recipe listings, and expiration dates through the coding or through product website correlations of the information.

Embodiments of the invention implement display technologies that allow for an integrated flat panel computer technology on a surface of the appliance such that the surface is transparent to visualize items within the storage area; the display can change to a functional computer system for easy file access on a hard drive or network; and the display can create an image or transformational effect that implements a color-change or design that coordinates with the ambience of a room. The design of the transformational display may also include a three-dimensional (3D) removable design panel or three-dimensional image such as a hologram or a 3D-ready display. Further desired functionality and design are described in greater detail as follows.

BRIEF DESCRIPTION OF THE DRAWINGS

The accompanying drawings, which are incorporated in and constitute a part of this specification, illustrate various embodiments of the present invention, and, together with the description, serve to explain the principles of the invention. The various features are not necessarily drawn to scale. In fact, the dimensions may be arbitrarily increased or decreased for clarity of discussion. In the drawings.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

The present invention may be executed in a variety of systems, including a variety of computing systems and electronic devices under a number of different operating systems. In an embodiment of the present invention, the computer system integrates communication features that provide for telephony, enhanced telephony, messaging, and information services. The computer system is able to be connected to a network, such as the Internet by either a wired link or wireless link. The computer system may be a stand-alone system or part of a network such as a local-area network (LAN) or a wide-area network (WAN). The present invention utilizes a computer system that performs computing tasks such as manipulating data in storage that is accessible to the computer system via access through shared networks and mobile devices. The storage unit may utilize a hard-drive computing system, a network share point, a mobile or portable device, or a cloud computing system. The computer system includes at least one output device and at least one input device, preferably in the form of mobile wireless connections, but also through direct keyboard inputs, audio devices or speech recognition devices. Further, the computer system includes self-monitoring, analysis, and reporting technology systems (SMART computing) typically as a hard-drive feature, but may be integrated in a wireless network or server.

Figure 1:
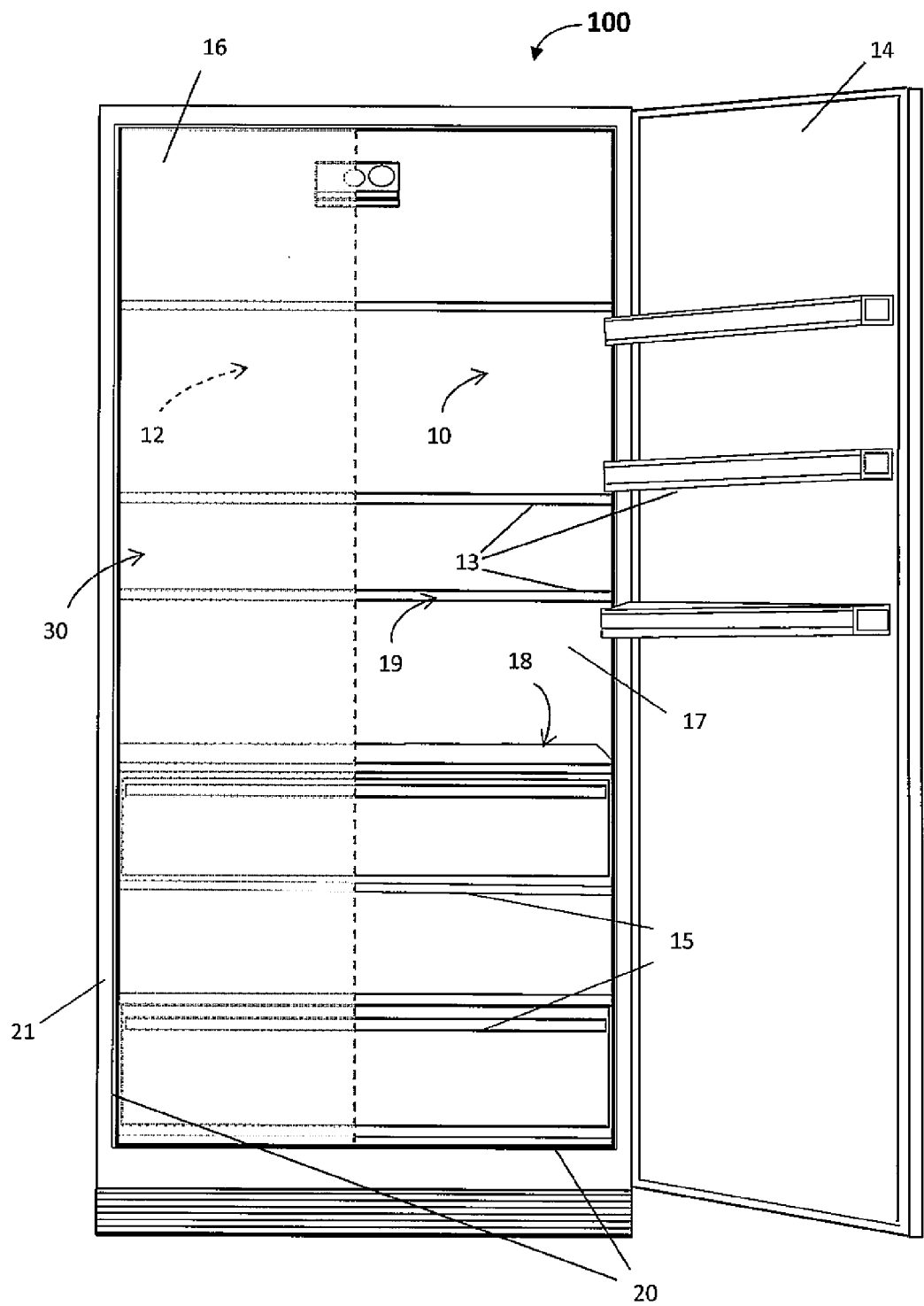
FIG. 1 is a depiction of an illustrative embodiment of the invention.

Referring now to the drawings, FIG. 1 depicts a refrigerator 100 comprising a cooling compartment 10, a freezing compartment 12, and respective doors 14 and 16 to seal off the compartments 10 and 12. In the embodiment depicted, the refrigerator 100 is a side-by-side refrigerator which comprises a plurality of weight-recording shelves 13 and removable drawers 15 that divide compartments 10 and 12 into multiple mini-storage areas 17 as defined by the areas between the top surface 18 of a shelf 13 and an underside surface 19 of another shelf 13. Without limitation, a top-bottom refrigerator with a freezer compartment or beverage compartment located at the top or bottom or anywhere in-between may integrate features of the invention as described.

The refrigerator 100 of the invention includes a peripheral scanner 20 integrated with the frame 21 of the opening to compartments 10 and 12. The scanner 20 captures an image or text of a product label (see FIG. 5) through optical character recognition (OCR) to allow the information to be stored on a computer. The scanner 20 comprises a charge-couple device (CCD) array, mirrors, scan head, glass plate, lamp, lens, cover, filters, stepper motor, stabilizer bar, belt, power supply, interface port(s), and control circuitry, one or all of which may be integrated into the power system that operates the refrigerator. A separate power supply and control circuitry, however, allows for a removable scanning system 20 that may be installed and removed from a conventional refrigerator or freezer. The scanning system may include flexible components and air/water-tight seals to prevent interference with an opening or closing door of the refrigerator or freezer. The CCD would also be capable of being integrated with computer processing systems and laser spectroscopy to detect and identify ingredients or compositions of materials introduced into or removed from the storage compartments 10 and 12. It would therefore be beneficial when the CCD is utilized in this aspect to integrate a separate compartment for spectral detection absent any extraneous [visible] light interference.

Figure 5:
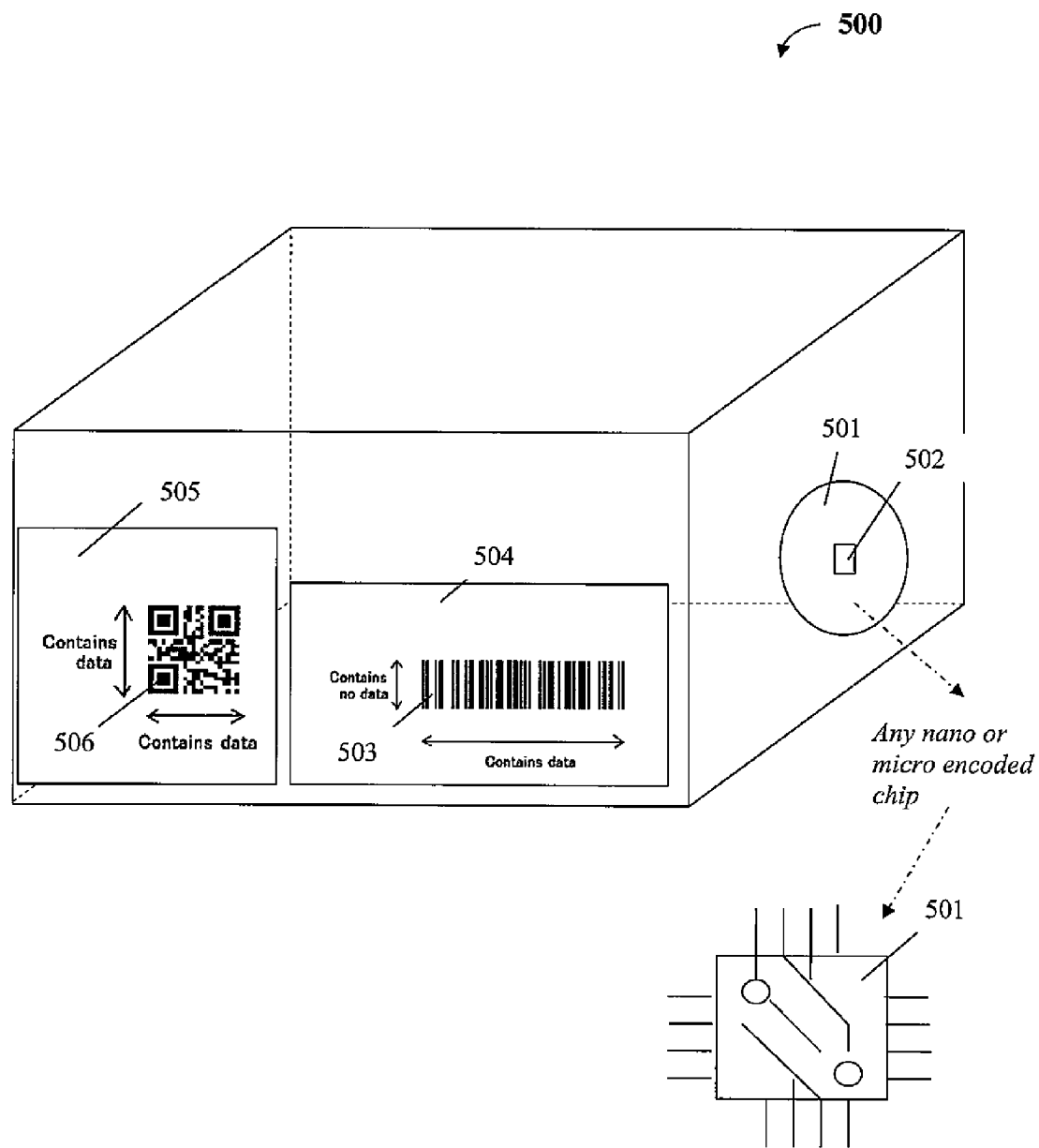
FIG. 5 illustrates 1D, 2D, and 3D readable codes that are utilized in the invention.

For exemplary purposes only, and not limitation, FIG. 5 depicts a product 500 that incorporates the uses a nanochip reader as the scanner 20 to interrogate and record information stored on the 3D nanochip 501 of flexible label 502. A barcode 503 having readable data in one direction is shown on a second label 504, as well as a QR code 505 shown on a third label 506. Preferably, one label is utilized such as a barcode 504 that embeds a nanochip 501 on an opposing side of the label or somewhere on a surface of the product 500 itself, on either an inside or an outside surface, or anywhere on a product's packaging.

In one embodiment, the nanochip reader can activate the nanochip 501 passively by energy emissions (or reflection), by an interrogator, RFID, or laser recognition. An actively powered nanochip may be utilized as well such that a nano or micro-size battery would be integrated therein. In another aspect, the nanochip may be replaced with a microchip, or any size, shape or dimension of scaled device to adhere to a product or be incorporated therein or within a product's packaging.

FIG. 1 is also capable of utilizing a barcode scanner, alone or in combination with the nanochip reader. As depicted in FIG. 5, a barcode 503 comprises unidirectional data. The scanner detects light from the illumination system, which records an analog signal with varying voltage that represents the intensity of the reflection. The sensor/converter changes the analog signal to a digital signal which is sent to the decoder. The decoder interprets the digital signal, confirms and validates the barcode. The barcode then gets stored in the memory of the computer system, acting as a digital storage of inventory, or database of compartment storage information. Information regarding the item scanned, including ingredient listings and nutritional facts are also incorporated in the database.

Various embodiments of the invention integrate QR codes and scanning systems to interpret QR code 506 as shown in FIG. 5. The QR code is a two dimensional (2D) code on the side of the product 500 and incorporates information as to product manufacturer, ingredients listings and such information that would be uploaded into a database or stored on a memory chip. The product 500 depicted is capable of incorporating any number of codes on a surface of the product, or in its packaging, including inside the packaging or integrated on a surface of the actual product. For exemplary purposes, and not limitation, the 2D codes are integrated upon the surfaces of a product such that a scanning system interprets consumer product information as available in the uniform coding system utilized by retail stores while also implementing the resourceful information from the 2D matrix QR code.

In one embodiment, a 3D image is created to identify and store information regarding the product. The 3D image can be a hologram or a hologram integrated on a flexible label and affixed to packaging by way of a flexible sticker or other adhesive. The 3D code may also be embodied as a flexible adhesive that uses both barcode and QR code such that a variety of information can be scanned and incorporated into the electronic tracking system. The encoded systems can therefore read and record thousands of characters per code and integrate multiple data into the database. The 3D code beneficially is universally readable in a variety of commonly used scanners or modified versions of scanners that interrogate the 3D image.

Various other data encoding systems are integrated into the labeling and identification scheme to track products from manufacturing to delivery and consumer use may be used as well.

In one embodiment of FIG. 5, the nanochip label 502 includes a microchip or similar identification tag within the nanochip 501. In one aspect, the microchip alone is also capable of being utilized with the current system. In FIG. 5, the nanochip 501 is a MEMS-based advanced memory device readable by way of an RFID scanner. Electric power for the MEMS-based device can be obtained from the environment by extracting energy from mechanical motion and vibration by using piezoelectric materials; air/liquid flow by using a miniature air turbine generator; temperature gradients by using thermopiles; pH gradient by using chemical electrodes; and particle radiation by using p-n junction or other converters.

The nanochip provides a more efficient scanning system such that the nanochip can be affixed on the backside of a barcode label that uses an adhesive to adhere to the product surface. The use of nanochips allows placement of the identifier/tracking device at any location of a product as well as anywhere internal or external to product packaging. The invention works well in integrating currently used labeling and tracking techniques as well. For exemplary purposes, and not limitation, the nanochip or microchip includes a global positioning system (GPS). The invention aims to provide a cost effective means for providing features that can be implemented easily into conventional systems.

An RFID system is also beneficial in one embodiment of the invention. The RFID system comprises three parts: the RFID tag itself, the RFID reader device, and a backend IT system. Typically, the RFID tag comprises a silicon chip that holds a defined amount of data (such as a unique identification number), and an antenna that is used to communicate with the remote reader device. Chipless RFID tags can be utilized as well, which use certain RF-reflecting properties of materials and embed the configuration of RF fibers in the paper. The reader device communicates with the RFID tag by sending and receiving radio-frequency waves. This communication differs between so-called passive and active RFID tags. Passive RFID tags do not have a power supply in which the energy stored in the reader device's radio-frequency interrogation scan is enough to wake up the RFID tag and to enable it to send a response (e.g. the RFID tag's data) to the reader device by means of reflection. Active tags use a battery that allows them to respond to the reader's interrogation with a stronger signal, thus increasing the distance from which the tag can be read. The backend IT system is responsible for cross-referencing the RFID tag's ID number with a database record that describes the object to which the tag is attached.

When an item is placed into the refrigerator 100, or fridge 100, the scanner 20 reads the code or microchip on an item (e.g. as would be read from a grocery scanner or radiofrequency identification (RFID reader). The computer processes and stores the item information, including product name, manufacturer, ingredient list, nutritional facts, recipe information, location of production, sources of produce used, volume or weight, fluid level in container, price paid and any other recorded data. When the item is removed from the refrigerator, the scanner reads and records the same information to allocate an item absent from inventory and placed on a grocery list. Where the database is linked to a network or internet connection, the grocery list can be correlated with estimated costs of products in a geographic location or pertaining to a particular store. Then, the consumer can identify their preferred shopping centers based on availability, product selection, and pricing.

If a portion of an item is consumed and then replaced into the refrigerator, a weight-recording shelf 13 appreciates the lost weight of the product, calculates the volume displaced based upon a corresponding automatic calculation of reduced weight of the item, and records the amount of the item actually replaced in the refrigerator. Where two or more items are removed simultaneously, the SMART function of the fridge identifies the item through a three-dimensional (3D) imaging device or camera that correlates the weight displacement with the reduced volumes replaced and records the estimated amount into the database. When volumes or weights of an item reach a low amount (i.e. less than 25% recorded by the imaging device), the item is placed in a list designating that a refill will be needed. Where the database calculates how quickly items are utilized and replenished, the processor will also be able to predict items that will need replenishing by a designated date. A mobile device application or internet interface allows the user to visually access data and images of the internal compartments of the appliance from a remote device.

A mobile device interface would also be capable of specifically interrogating the contents of the refrigerator and amounts, quantities, and/or qualities of goods contained therein. Such communication would utilize the 4G and 3G networks, Wi-Fi or any other wireless or direct connect to a network. For exemplary purposes, and not limitation:

Scenario 1: While driving home, the consumer realizes a forgotten item that was on the grocery list. A query goes out to the network to locate an item nearest the traveling vehicle's GPS location. When a product (or multiple products) are located, an indicator or alarm designates the product's location, store name, pricing, and any other information as integrated in the product information database for that particular product.

Scenario 2: While walking through a grocery store, the consumer's electronic grocery list (as incorporated in the system) recognizes nearby items that are on the list and again indicates product location within the store. Low volumes or quantities of products within the home refrigerator also set off an indicator such as where only 20% of a gallon of milk is remaining in the consumer's home fridge, walking by the refrigeration section of a grocery store would trigger an indicator that designated "milk replacement needed" by voice, alarm, or other vibration effect of the mobile device.

Returning to the embodiment of FIG. 1, the doors 12 and 14 of the device 100 integrate features of the invention that enable energy-saving, efficient use of the refrigerator 100. Here, the doors 12 and 14 have transparent front panels/displays 30 that allow items within compartments 10 of the refrigerator or freezer to be easily visualized without opening the door. (See FIG. 7). Since the refrigerator 100 operates as a SMART computer, the display surface 30 is a touch-screen surface that operates with selective functionality (or no functionality at all). The doors may be transparent as stated prior, a mirror, or translucent to create a unique image on the refrigerator surface when the doors are both closed. The surface may integrate colors or patterns that coordinate with interior room design as well. For exemplary purposes only and not limitation, the surface 30 is a transparent surface that has a remote power on/off to turn the computerized display monitor into a computer with file accessibility, to a video screen, or to an image, picture, or fashion display that incorporates and captures the aura or atmosphere in a room. A mobile app or handheld device is capable of accessing refrigerator scanning and imaging systems. A mobile device or handheld or touch control surface upon an exterior surface of the refrigerator is also capable of transforming the refrigerator display panels to various images, displays, colors, 3D images, or 3D holograms. The panels may also be coordinated with current kitchen designs, including wooden paneling images or colors that can be adjusted to match kitchen cupboards or surrounding surfaces.

Figure 2:
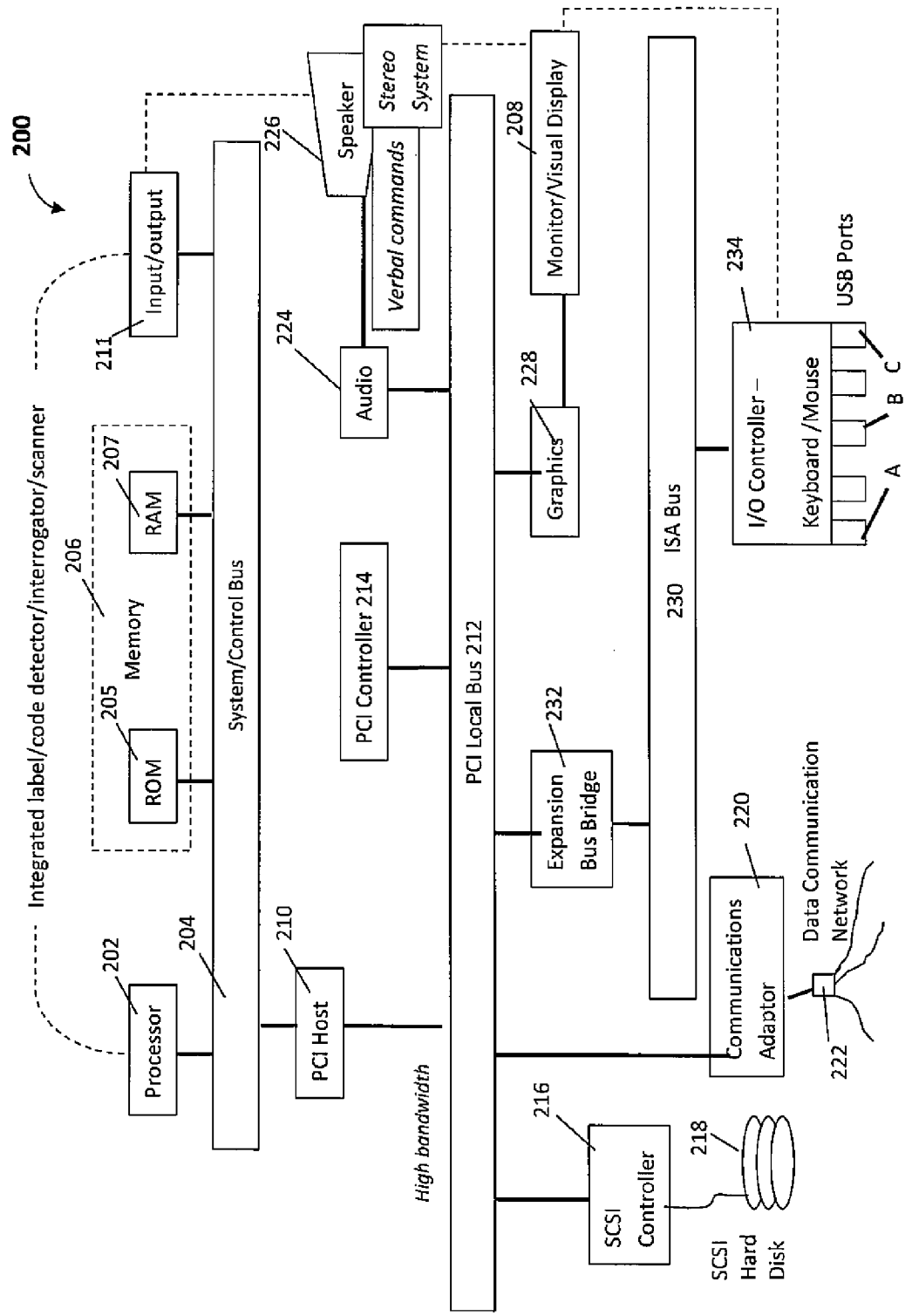
FIG. 2 is a schematic that depicts internal communication components.

FIG. 2 depicts a block diagram of an embodiment of a computer system that may utilize the electronically managed storage system of the present invention. As shown, the data processing system 200 includes at least one processor that is a general-purpose processor and coupled to a control bus 204. During typical operation, the processor 202 processes data under the control of operating system and application software stored in the memory 206, including random access memory (RAM) 207 and Read Only Memory (ROM) 205. The operating system provides a graphical user interface (GUI) 208 to the user. Embodiments of the graphical user interface may be varied from a transparent interface with holographic imaging to a computer display surface, reflecting minor, or imaging display surface that integrates design features that complement the character, ambience, and interior design of a home. Embodiments of the display of the invention will be described in the following. Application software includes instructions that the processor 202 executes to carry out the operations depicted in the flowcharts of FIG. 3 and FIG. 4.

Each processor 202 is connected to the control bus 204 and Peripheral Component Interconnect (PCI) Host Bridge 210 to PCI local address bus 212. PCI host bridge 210 provides a path for the processor 202 to directly access PCI devices mapped anywhere within bus memory and/or the input/output address spaces. PCI Host Bridge also provides a high bandwidth path for allowing PCI devices to directly access RAM.

PCI local bus 212 interconnects a number of devices for communication under the control of the PCI controller 214. These devices include a Small Computer System Interface (SCSI) controller 216 that provides an interface to SCSI hard disk 218, and communications adapter(s) 220. The adaptor(s) interface the data processing system to at least one data communication network 222 comprising wired and/or wireless network communications.

An audio adaptor 224 is attached to the PCI local bus 212 for controlling audio output through a speaker 226. A graphics adapter 228 is also attached to PCI local bus 212 for controlling visual output through a display monitor 208.

In another embodiment, additional peripheral components may be added. For exemplary purposes, and not limitation, a tactile display component may be included along with one or more distinct imaging displays that create a fashionable panel for the front of an appliance (e.g. a refrigerator panel that would be integrated with the refrigerator 100 as shown in FIG. 1 or as a removable panel integrated with a conventional refrigerator that has a removable panel or removable door.

PCI local bus 212 is coupled to an Industry Standard Architecture (ISA) bus 230 by an expansion bus bridge 232. The ISA bus 230 has an attached Input/Output (I/O) controller 234 that interfaces data processing system 200 to peripheral input devices such as a keyboard and mouse, and supports external communication via parallel, serial and universal serial bus (USB) ports A, B, C, respectively).

Any computer system, PC or MAC based, among others may be integrated with the current controls of the scanning systems and various embodiments of the invention. Without limitation, the above merely provides a suggested computing storage. An Android or iOS operating system may therefore be incorporated therein or provide mobile apps to interface and communicate with the scanning system integrated in the storage unit or directly with a computer integrated with the storage unit itself.

Figure 3:
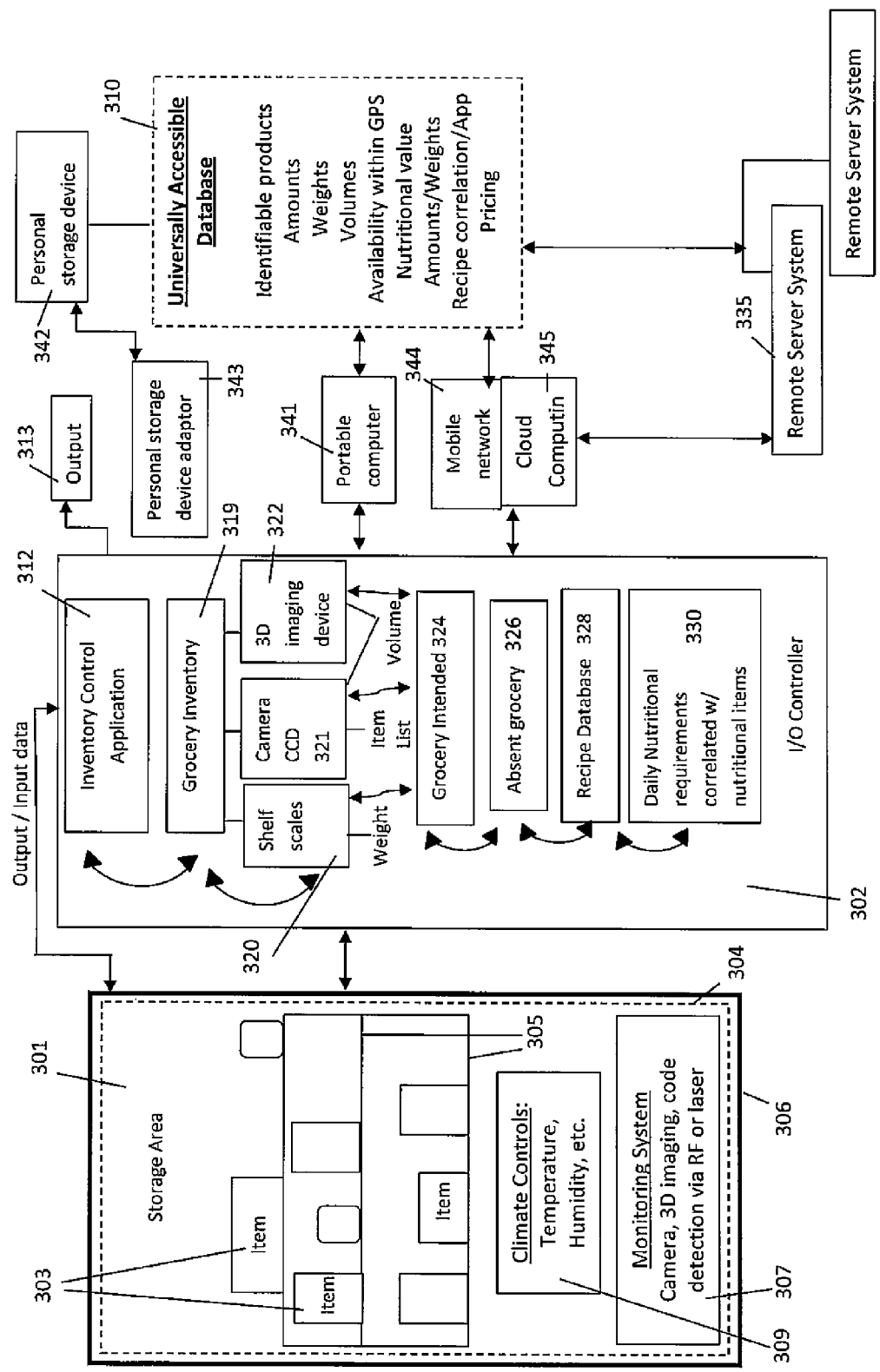
FIG. 3 is an input/output scheme.

FIG. 3 is an input/output scheme that depicts the management of an electronic management storage system 300 in accordance with the invention. As illustrated, the input/output system (controller) 302 may include components of a computer system such as the data processing system 200 as depicted in FIG. 2. In FIG. 3, a storage area 301 comprises a tracking system 304 that is a scanning device, alone or in combination with an imaging device, and positioned at a periphery of the storage area 301. The tracking system 304 (similar to the scanning system as utilized in FIG. 1) can also be positioned along an internal perimeter of any opening or entrance to the storage compartments. The tracking system is in connection with a communication medium 306 that takes the form of a network device, internet connection, or mobile application on a personal computing device, mobile device and/or SMART phone. The tracking system may be implemented along any surface that is adjacent an entrance or exit to a compartment, room, facility, loading area or vehicle.

As illustrated in FIG. 3, the storage area 301 comprises various items 303 stored on a number of weight recording shelves 305. A computer system internal to the tracking system 304 includes a monitoring system 307 for visual depiction of items contained therein as well as a climate control 309 relative to outside temperature, pressure and humidity.

Data is then incorporated into an electronic inventory 310, or product information database 310 as products enter the storage area 301. The product information database 301 includes a listing of products, recipe usages, each product's ingredient listing, nutritional value, pricing at particular stores, availability at particular nearby stores, quantity currently available (e.g. amount, weight, volume), quality (e.g.

using expiration dates), and any manufacturing or usable consumer information, including recalls which would draw on FDA safety notices via the internet or public alert communication system.

As products move in and out of the storage area 301, information regarding the one or more products added or removed is recorded in the product information database 310. An inventory control application 312 can directly list the products and details of each product electronically through an output interface 313 of the tracking system and display, through a portable computer system 341, personal storage device 342 and adaptor 343, mobile network 344, or cloud computing 345. The inventory control application manages the grocery inventory 319 by way of the shelf scales 320, camera/CCD 321, or and/or other 3D imaging device 322. The recordings of amounts and quantities or qualities of items then generates a grocery list 324 of intended items for purchase from the grocery that gets designated as depleted in the absent grocery listing 326. When a consumer designates a particular recipe from the recipe database 328, data within the inventory control application correlates availability of products within the grocery inventory of the storage device with that already on the grocery list and the absent grocery list to determine items needed for the particular recipe. The grocery list then reflects ingredients or items needed for purchase to make the select recipe. Manual input is also available.

A daily nutritional correlation 330 is also integrated for health-minded consumers or weight-watching consumers who would like to control items suggested, points utilized in a weight loss program such as Weight Watchers, carbohydrates consumed for a particular consumer as can be individualized in the database. Any information pertaining to products and consumers can thus be integrated with the inventory control application and any input or output of information.

As information is recorded in real-time, personal computing systems and mobile devices allow for access to internal components of a storage area or refrigerator via network access. The product information database is integrated into a universally accessible database and is accessible to a personal storage device 332 in FIG. 3 through an adaptor 334. Any mobile devices as currently utilized may be used to interconnect to the wireless communication network of the storage tracking system 302 or any SMART appliance as illustrated in FIG. 1. Remote servers 335 may also be integrated with the system to facility data networking.

Figure 4:
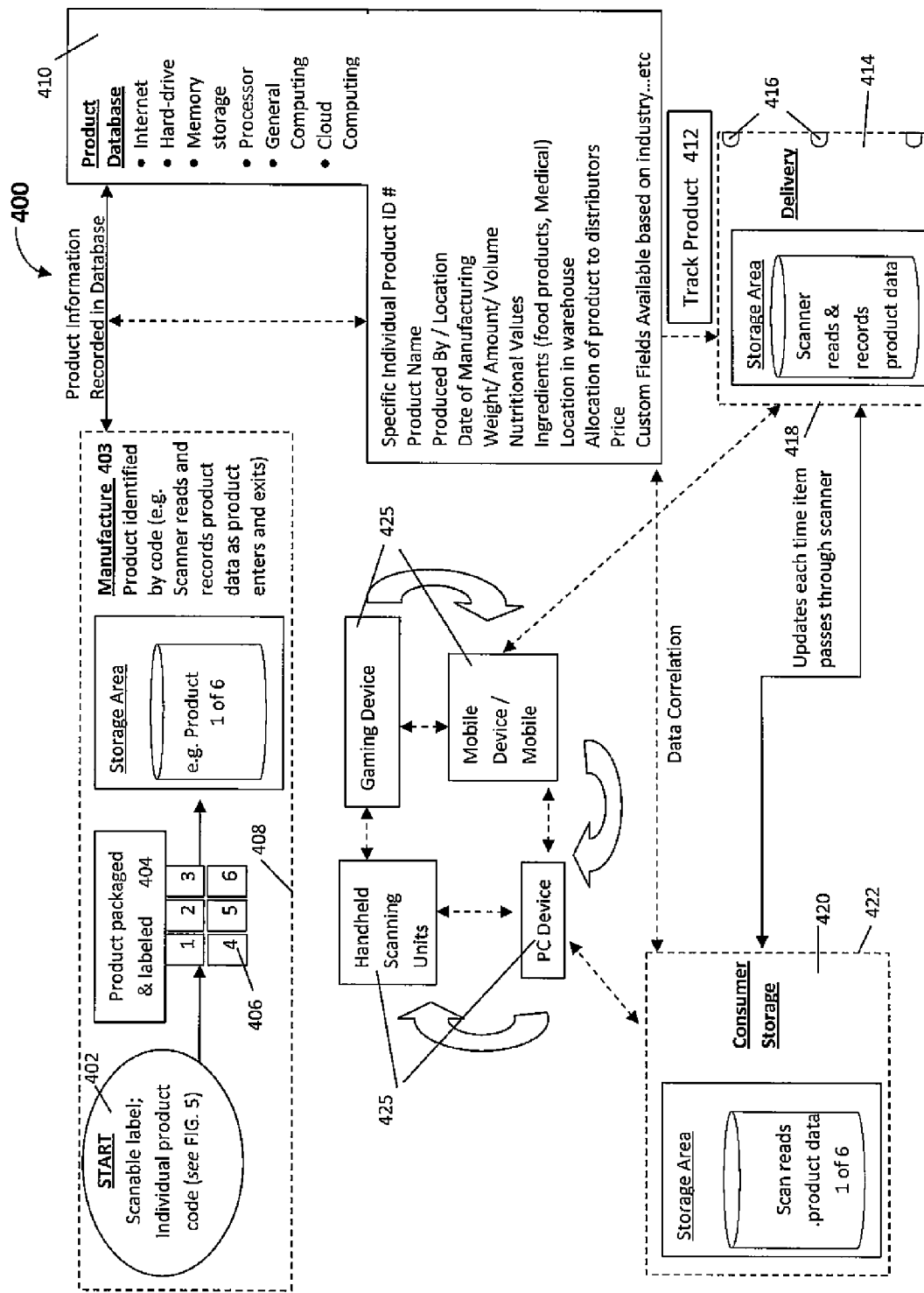
FIG. 4 is a mapping component of the system and data management and retrieval.

FIG. 4 is a mapping component 400 of the system for data management and retrieval from manufacturing 403 to consumer storage 420. As a product is manufactured, a scanable label 402 is produced in manufacturing 403 to identify the particular product with an individual product code. The product is tracked through manufacturing and packaging, delivery to consumer use throughout its lifespan, or even through disposal. As the product passes into a packaging facility 404, the scanable label tracks the product, and products 1, 2, 3, 4, 5, 6 shown here into a box 406. A scanner 408 present at the entrances and exits of the manufacturing facility 403 first detect the new item, reads and records the product information into a product information database 410. The product information database is accessible via internet, cloud computing, hard-drive, memory storage, and/or general computing processor as utilized in modern technology. Where the label includes a nano or microchip 412 and/or a GPS locator, the label is tracked via wireless network as well as through the scanning systems. Additional electronic components may also facilitate tracking of the product.

As the product moves out for delivery 414, internal cameras 416 in combination with the scanning device 418 tracks the products location and any pertaining information as to delivery service, temperature controls of the delivery truck, location, and other information that would track a product's handling through delivery to a consumer. When the product arrives at a storage unit 420, the product is again automatically scanned as it passes through the scanner 422 at the perimeter of the entrance and information associated with the product is correlated in the universal product information database. As the product passes through an exit of the storage unit and into consumer hands, the product would again be read and information as to the product recorded. All data regarding a particular product is correlated whenever the product passes through a scanning system of the invention. The scanning system itself is linked to the product database that correlates data in real-time, provides updates, and allows accessibility via electronic and mobile devices 425.

Figure 6:
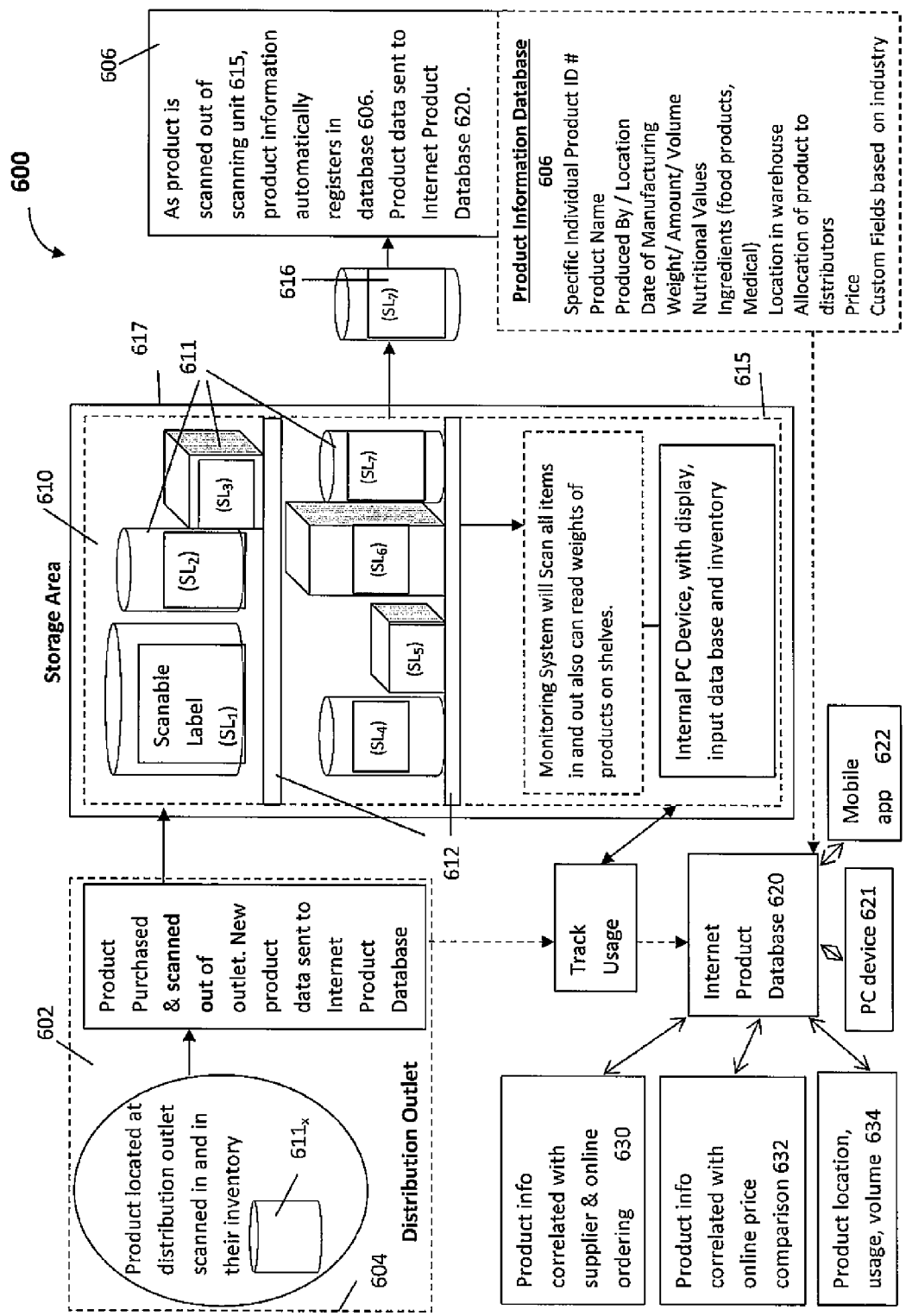
FIG. 6 depicts an embodiment of the invention during distribution and storage.

FIG. 6 depicts an embodiment of the invention as a SMART scanning system 600 for use in general contracting, supply and distribution, the automotive industry, any high throughput inventory or industrial field. Here, a distribution outlet 602 houses products 611 (each having its own unique identifier/code label) that are located and scanned into inventory while passing through the perimeter scanning unit 604. The perimeter scanning unit 604 is a SMART system in itself such that when placed at an entrance and exit of the facility, a product entering or exiting the facility will be tracked and information correlated with the particular product information in the internet product database 606. The perimeter scanning unit can be implemented in any opening to a storage unit, or integral with the perimeter of an entrance or exit to define a scanned area where the product passing there-through can be read at any location within the defined area.

When the product is purchased and scanned out of the distribution outlet 602, product information is sent to the product information database 606. The products 611 such as $SL_1$, $SL_2$, $SL_3$, $SL_4$, $SL_5$, $SL_6$, $SL_7$ then enter into a storage area 610 having weight recording shelves 612 (e.g. shelves implemented with a scale, balance, or other weight/mass measuring device). A monitoring system internal to the scanning unit 615 reads and records a product label 616 while also integrating the information as to the weights or masses of the products on the shelves. Here, the scanning unit 615 is placed at the perimeter 617 of the storage area. For exemplary purposes only, and not limitation, product weight is recorded in the database when the product is placed on the shelf 612. When the product is removed for use, the scanning unit reads and records the product label 616 of the product and correlates information associated therewith in the product information database of the scanner and delivers the information to the internet product database. The product can be used and then replaced in the storage area at which point the shelf 612 again recognizes the product label, associates information with the database, and stores new information pertaining to the consumed volume.

The products 611 therefore are tracked throughout distribution and storage through to purchase by a consumer or another distributor. Each time a product passes through the scanning systems 604 and 616, the product information is incorporated into the internet product database 620. A GPS tracking device may also be integrated with the coded label to determine a particular location of a product within a region, within a distribution outlet, or within a specific storage area. For clarification, the embodiment illustrated in FIG. 6 utilizes an internet product database (IPD) 620 for the distribution outlet 602 and a product information database (PID) 606 for the storage area that correlate data in real-time. The databases may be integral or shared, but here distinguished such that the IPD 620 is internet accessible and the PID 606 is privately managed, password protected, or used internally within a company or within a particular industry, or industry field. The use of multiple databases allows companies to set up databases compatible with the scanning system and associated codes/labels to track products and particular product information as a product moves through the market. The information in the multiple databases correlates and then associates with the product at its current location. Thus, selective correlation and selective association between databases allows for data security in the system. The information is further accessible at any scanning point directly, or via personal computing (PC) device 621, mobile device 622 or through a created mobile application. In one embodiment, the product information is correlated with supplier and online ordering 630, with online price comparison 632, and current location, usage, and volume of product recordings 634. Cost efficiency, safety, handling, delivery, and other product management would therefore be recordable and trackable in the electronic management system.

To define the use of the electronic management system or apparatus of the invention, and its implementation within a storage area, 'storage area' as utilized in the language of the specification refers to warehouses, distribution outlets, vehicles, trailers, permanent and mobile storage units, refrigeration and freezer units, and any structure that could implement a perimeter based scanning system. For exemplary purposes only, and not limitation, the apparatus as housed in a storage area utilizes a perimeter of the structure to ensure a product is scanned as it passes through the scanning area. In one embodiment, the apparatus is a integral scanner with an appliance or constructed unit. In another embodiment, the scanner is a stand-alone lattice structure that is strong enough to support and balance itself for mobile uses.

Although uses for the apparatus described have typically referenced storage areas, the usage of the apparatus can also be implemented at theme parks, guest facilities, schools, government buildings, warehouses, public entertainment areas, or other population capacity or control area. In one aspect, the apparatus is utilized in a government building such that an encoded label/chip is attached to products entering the building and tracked throughout the building until exit or until entering another government facility. As compared to ID badges, the scanning units of the present invention would not require a manual swipe but would be automatically detected as the employee's individual badge recorded information regarding the employee's whereabouts, past, present, and future as the employee passed through the scanner (e.g. as hidden in the perimeter entrance). Enhanced security measures at airports, public schools and buildings would therefore benefit with the enhanced innovative tracking system. In another aspect, individualized databases would be constructed to determine specific information to be recorded by the identifiable code.

Figure 7B:
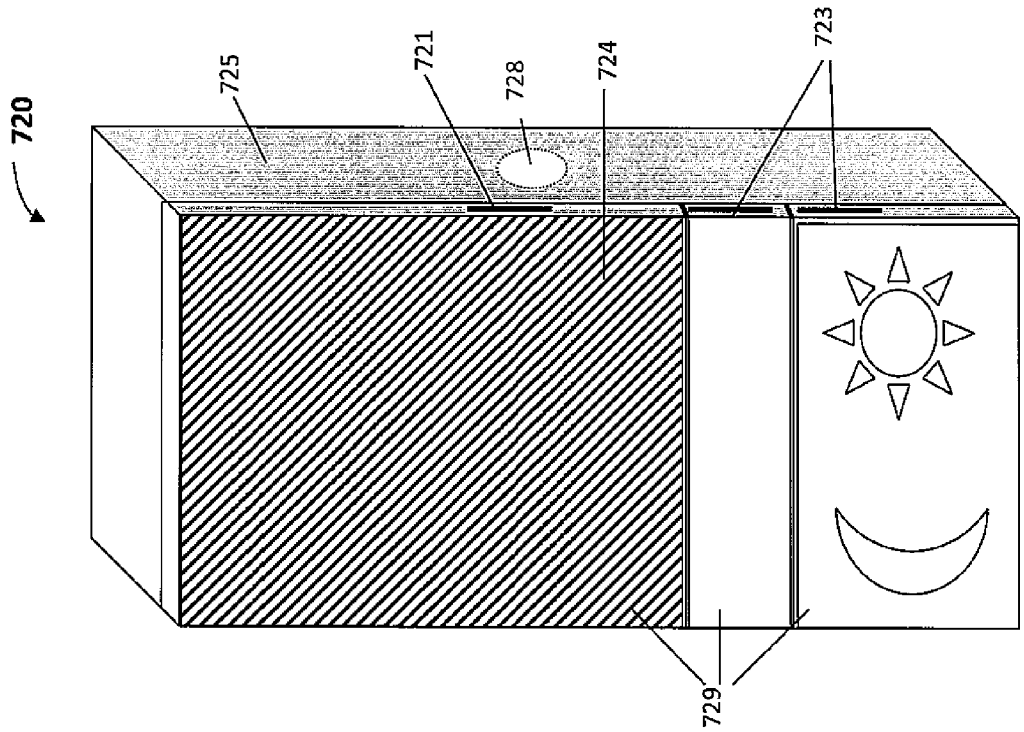
FIG. 7A and FIG. 7B depict variations of the display of the invention.
Figure 7A:
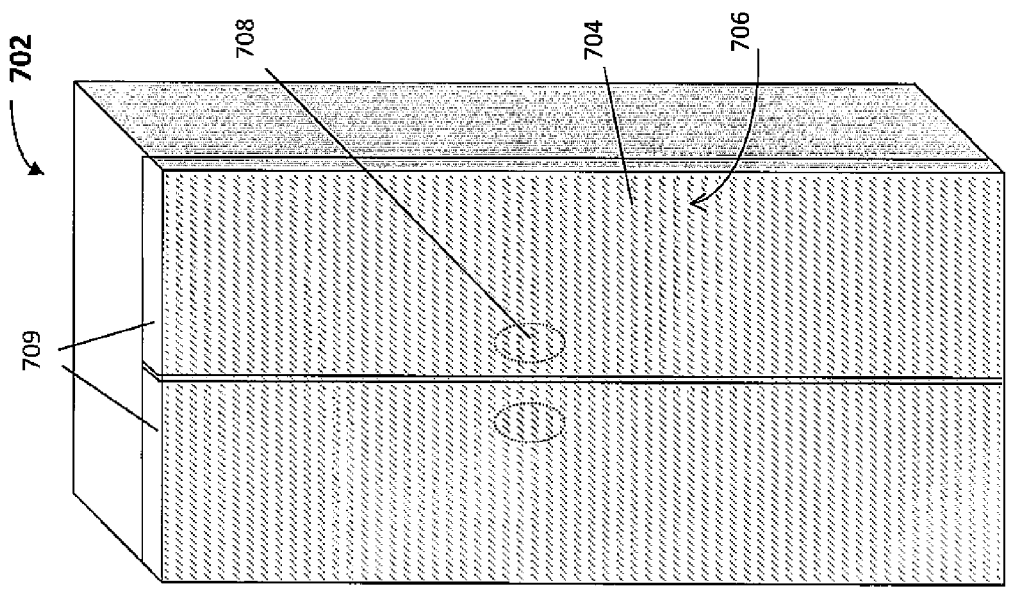

As shown in the embodiments of FIGS. 7A and 7B, display panels digitally control the physical attributes of an appliance display. The display panels create digital images, changes color, transparency, and offer additional features that allow an individual to creatively design an appliance with the attributes of a room. The display panels further offer fashion and interior design capabilities that enhance the character and ambience of a room.

In the embodiment of the invention as illustrated in FIG. 7A, a refrigerator 702 comprises a display 704 that is an interactive flat touch-screen surface 706. The surface 706 is a surface activated display that integrates touch-screen capabilities, including adding images or files shared on a shared network, video capabilities, or household management lists. The display surface 706 may also be 3D-ready to screen 3D images or 3D video. A video freeze capability captures digitally streamed video and magnifies or reduces the image. The surface 706 integrates computing components that allow the refrigerator 702 to act as a SMART refrigerator 702 with the capabilities of a wireless mobile device. The surface may integrate one or more flat panel LED/LCD/plasma screens as well, though cost effective measures as well as weight, size, and dimension factors may be the deciding factors. Touch panels 708 are sensitive to control automated opening and closing of the doors 709 of the refrigerator 702.

FIG. 7B is an embodiment of the invention as a SMART refrigerator unit 720 which has a digitally controlled display 724. The display can be a uniform image across the doors 729 or the images upon each of the doors may differ (as illustrated) and be controllable via the touch-screen feature. One image may depict a 3D image while another designates time, temperature, weather conditions, other environmental condition, or safety alert. The display may also be programmed as a television or audio device as well to broadcast news, read audio books, or play video format. Manual handles 721 and 723 open the conventional doors. A touch-sensitive surface 728 on a side surface 725 also provides a feature that automatically controls the opening, closing, and locking of the refrigerator doors 729, each of the doors opened, closed, and locked/unlocked, alone or in combination. A time-sensitive lock also beneficially allows parent control or limits individual access to certain compartment located therein.

Figure 8:
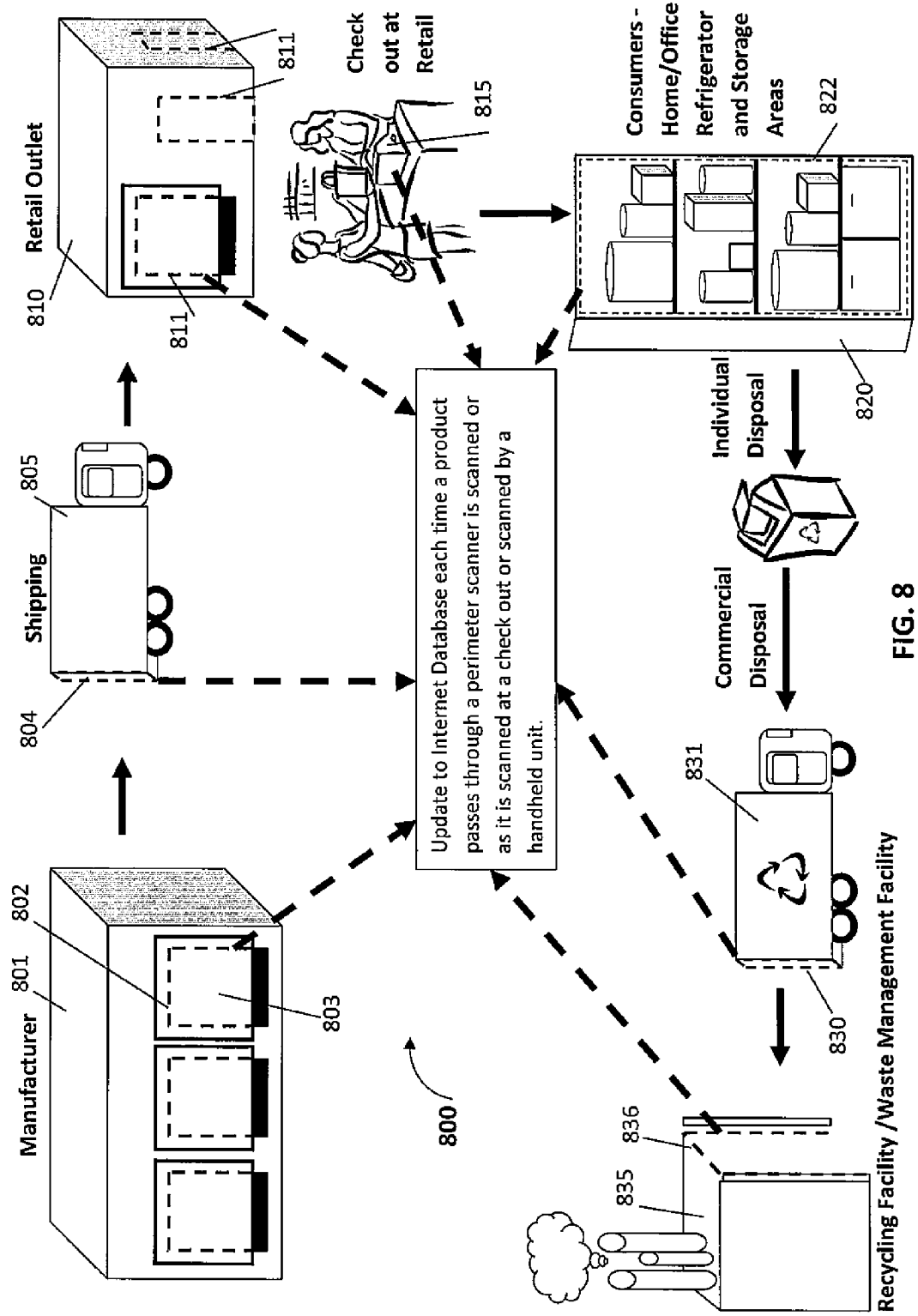
FIG. 8 illustrates the use of the system from manufacture to delivery, warehouse, and through consumer use.

In the depiction of FIG. 8, a flowchart demonstrates the plurality of uses of the scanning devices of the invention. At each location of a perimeter scanning device, product information particular to not only the actual product, but specific to the unique individualized product coded with a unique identifier label, is recorded into a universally accessible database, networked to shared systems or connected via internet or wireless connections. Product information can also be modified with a manual handheld unit as compatible with the invention described.

To begin tracking a product, a manufacturing facility 801 places a exit scanner 802 around the perimeter of its delivery/shipping doors 803 to track a product as it passes out the door 803. A shipping truck 805 loads the product through its trailer door 806 that has a perimeter scanner 804 to again read and record the product code and correlate product information in the database regarding any handling, climate conditions, delivery truck utilized, location, and other parameters as desired. A scanner 804 implemented in any surface of the trailer, on a wall or in the upper corners of the trailer may also have universal scanning capability where the three-dimensional volume of the truck is captured by the scanning device. The scanner 804 may also be incorporated in a two-dimensional wall of the trailer such as where the scanner projects illumination from a ceiling surface to track products within the three-dimensional volume. Such implementations of scanning systems may be incorporated in any storage facility or compartment, or any frame of a structure.

Returning to FIG. 8, a retail outlet 810 implements an interconnected scanning system 811 around all its doors to the outlet 810. As a consumer checks out a product via the cash register 815 or computerized system 815, the product data is recorded as to location of purchase, and detailed weights or parameters recorded as specified per each product. The scanning system may also be implemented at the checkout as a standalone system that registers the coded labels on all the products and provides a speed checkout as the pricing of all items is tallied within seconds or less. This further provides advantages in reducing the manual placement of goods onto a conveyor belt and manual scanning of each item. Lines for customer service are drastically reduced, providing cost effective and market competitive procedures for customer service supply and demand.

Aspects of the invention are realized here by security whereby any goods and services stolen or lost in inventory are reduced as the coded labels would also be tracked through the scanner units placed at the exits of a store or facility.

Statistical analysis and environmental groups further benefit from features of the invention such that the coded labels can potentially be tracked through the lifespan of the product and/or the product's packaging. A home pantry or refrigerator implements a scanning unit 822 as illustrated (details of which have been described prior). In another aspect, any office supplies, toys, hardware and tools can also be tracked in household rooms and garages. When the product has been consumed and either the product or the packaging disposed of, the microchip label referenced in prior scanning systems continues to be detectable by scanning units 830 of commercial disposal vessels 831, including garbage, recycling or otherwise. A recycling facility and waste management facility 835 implementing a perimeter scanner 836 at its entry and exit can therefore track further disposal. The benefits of the scanner as implemented in various markets being thus described can be modified in ways that do not venture from the spirit of the invention. Thus, similar components, features, aspects, solely or in combination may be implemented to improve the design as currently described without parting from attributes that make the invention novel.

Figure 9:
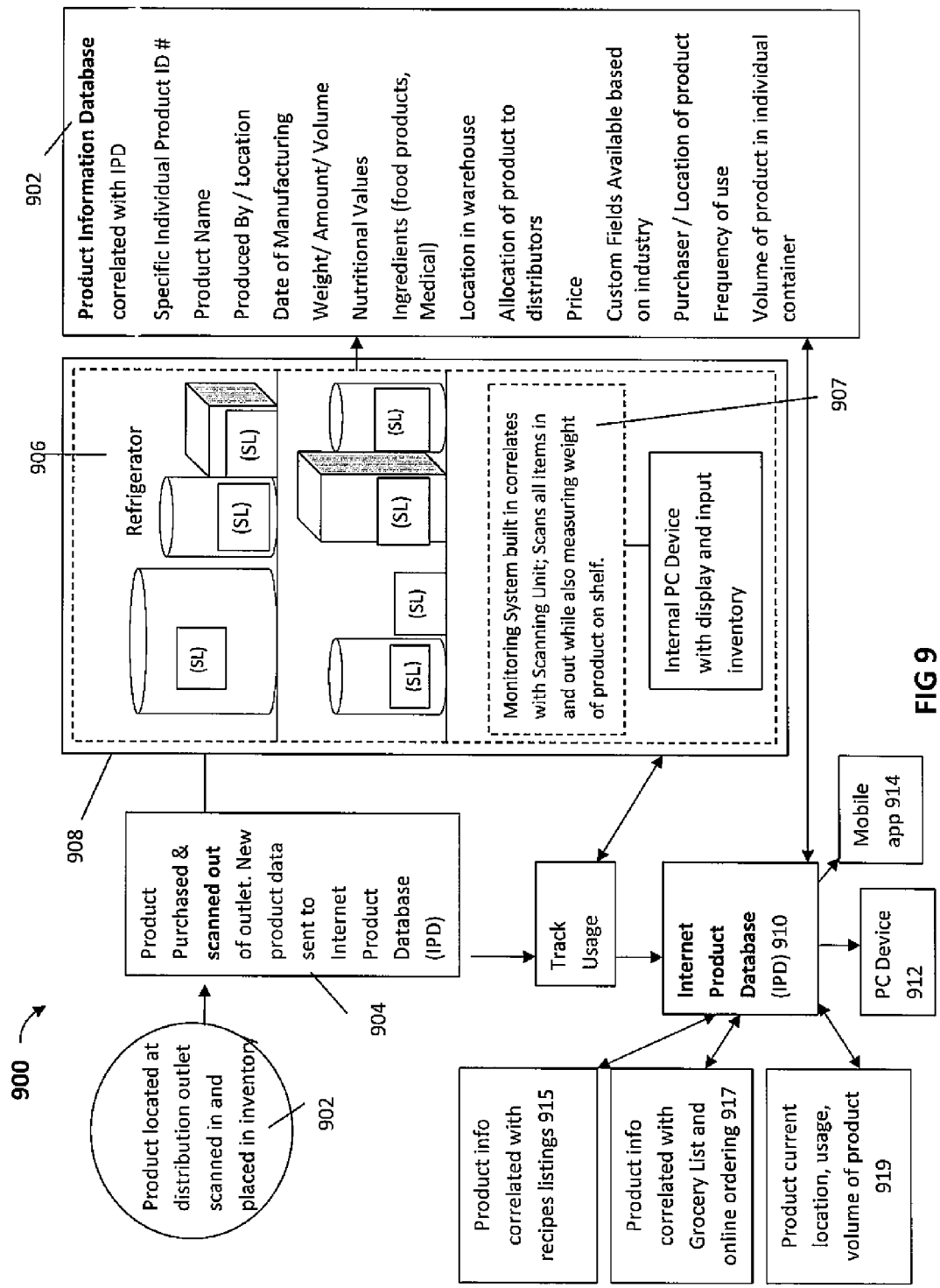
FIG. 9 is a schematic that depicts the tracking of a product and the product's data in an embodiment of the invention.

The invention as described in the embodiment of FIG. 9 characterizes the tracking of product data as it enters and exits a refrigerator such as that described in FIGS. 1 and 8. The refrigerator described may also take the form of a pantry in a household. Here, a product is located at the distribution outlet 902. The product passes through the exit of the outlet 904 and is automatically scanned. When the product is placed in a refrigerator 906, a scanner 908 reads and records the product label, while a monitoring system 907 records an image of the product and associates any information as recorded in the product database 910. Thereafter, anytime a product is removed from the refrigerator, any change in product information is recorded, calculations performed as to current conditions, settings, and attributes as desired by the consumer, and correlated within the scanning system. Usage of the product can therefore be tracked during use from a PC device 912 or mobile application 914. Data can be correlated with recipe listings 915, grocery lists and online ordering 917, and location/usage/quantity 919 of a product.

The tracking system described herein along with its scanning components and SMART systems facilitates the uniform identification of goods within a sales setting or within a household. The SMART systems implement apps and interfacing from high-speed networks and enable SMART household appliances. The SMART refrigerator automatically compiles customized grocery list compilations based on volumes and weights of items entering and exiting the appliance, including nutritional information recipes, and expiration dates of items. The appliance systems also implement display technology and touch surfaces that are accessible to computer networks and also have a design feature to transform the image of the appliance along with the interior design of a home or other setting.

Further, any additional features of scanning systems may be incorporated to include motion-detectors, active or passive systems for scanning, surveillance cameras, or any other feature that would be advantageous in tracking product information system. As utilized throughout the application, 'product' as defined includes any goods or services, or human manipulation of goods and services, including tracking of persons and animals or living organisms, viruses, or bacteria (as would be incorporated in a laboratory setting, research facility, healthcare, or geriatrics). Defense systems may also make use of better tracking of inventory and soldier location.

It is noted that aspects of the invention may be varied to accommodate different sizes, shapes and dimensions of apparati used in fields of consumer storage, inventory and marketing. Aspects of the invention may also be integrated in fields outside the marketing realm as desired. Such fields may include any inventory, security, or monitoring system, among others.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claim set forth here-below not be construed as being order-specific unless such order specificity is expressly stated in the claim.

What is claimed is:

1. A self-monitoring analysis and reporting technology (SMART) system comprising:
   a perimeter scanning unit comprising a microchip or nanochip reader, the perimeter scanning unit integral with a perimeter of an entrance and exit and defining a scanned area;
   a plurality of products labeled with unique identifiers, said unique identifiers comprising an encoded microchip or nanochip, and which are encoded systems that store information on the product, such information to include any recorded data, said microchip or nanochip further including a global positioning system (GPS);
   a processor or one or more computer control devices;
   a data storage medium comprising a computer storage unit, an external storage unit, or a cloud computing storage, and coupled to said processor or to one or more interconnects coupled to said processor; said data storage medium comprising computer program code comprising instructions executable by said processor and configured for:
      receiving product information from said unique identifier of each said product upon entry into a scanned area and removal from said scanned area;
      correlating said product information of said product with said data storage medium in real-time, such that a compilation of data is associated with said product in a product information database that is interconnected with said data storage medium;
      storing said product information, including said compilation of data in said data storage medium;
      receiving, at a universally accessible server system a request identifying said scanned area and said compilation of data associated with said unique identifier; and
      updating the product information database in real-time, as assessable via electronic and mobile devices;
   wherein one or more of said computer control devices include a mobile device that interfaces and communicates with the perimeter scanning unit to determine each said product and said compilation of data associated with each said product; and wherein during said step of receiving product information, said plurality of products enter or exit the scanned area simultaneously and said data storage medium records said plurality of products and said product information from each product simultaneously upon entry into and out of the scanned area to track past and present locations of the plurality of products; and wherein said compilation of data comprises a variety of product information, including ingredients, volumes and weights of said product, expiration date, manufacturing times and locations, pricing, storage conditions, temperature, humidity, and pricing included as updated measures in the product information database.

2. The system of claim 1, wherein when the variety of product information is recorded, calculations are performed as to current conditions, settings, and attributes as desired by the consumer, and correlated within the system during the step of updating.

3. The system of claim 2, wherein said scanned area comprises a warehouse, distribution outlet, vehicle, transport trailer, refrigeration unit, freezer unit, pantry, retail store, restaurant, research facility, an inventory management area, and capacity control area.

4. The system of claim 3, wherein said inventory management area is within a laboratory setting, research facility, or healthcare setting.

5. The system of claim 3, further comprising a medical storage unit, a medicine refrigeration unit, and a research refrigeration unit.

6. The system of claim 1, wherein said microchip or nanochip tracks living organisms including viruses, bacteria, persons and animals.

7. The system of claim 6, wherein said microchip or said nanochip comprises a Micro-Electro-Mechanical-Systems (MEMS) device and electronic components.

8. The system of claim 6, further comprising security measures that track said living organisms.

9. The system of claim 1, further comprising a plurality of said perimeter scanning units positioned at an entry into a location or an exit from said one or more locations.

10. The system of claim 1, wherein said perimeter scanning unit is positioned throughout a defined area for containing one or more products, persons, or both.

11. The system of claim 1, further comprising a camera or three-dimensional (3D) imaging device implemented with said perimeter scanning unit.

12. The system of claim 1, wherein said data storage medium is incorporated by a scanned area and has an inventory database accessible through a mobile device.

13. The system of claim 1, wherein said microchip or nanochip is passively activated by the perimeter scanning unit or battery operated.

14. A method for utilizing the SMART system of claim 1 comprising the steps of:

moving said plurality of products through said perimeter scanning unit and scanning said unique identifiers of said products;
receiving information pertaining to said encoded microchip or nanochip from said processor and from said product information database; and
correlating said information with said data storage medium in real-time.

15. The method of claim 14, further comprising a step of receiving, at a universally accessible server system a request identifying said scanned area with said unique identifiers.

16. The method of claim 14, wherein said step of moving and scanning occur simultaneously to facilitate automatic detection of said unique identifiers.

17. The method of claim 14, further comprising a step of tracking a plurality of said products, each having a unique identifier recorded in said data storage medium.

18. A refrigerator having the self-monitoring analysis and reporting technology system of claim 1, the refrigerator comprising:

two or more surfaces defining an internal area to preserve storage products and having an opening to access one or more storage compartments positioned therein;
at least one door positioned at said opening and having access to said one or more storage compartments; and
said perimeter scanning unit positioned within said internal opening and capable of identifying labels encoded with said unique identifier; and
said data storage medium accessible from said mobile device.

19. The refrigerator of claim 18, wherein said product information comprises one or more of: a specific code, product name, manufacturer, production site, production lot, date and time of manufacturing, weight, amount, volume, nutritional values, ingredients, global positioning location, position where stored in a warehouse, location upon a particular shelf or in a particular compartment, allocation of product to distributors, price, purchaser, location of product, frequency of use, and any custom fields identifiable within an industry.

20. The refrigerator of claim 18, wherein said scanning unit includes a camera or imaging device that integrates collected information into said internal data storage component.

21. The refrigerator of claim 18, wherein said at least one door includes a touch screen surface of a computer interface.

22. The refrigerator of claim 18, wherein said at least one door comprises a touch-sensitive surface transformable to a plurality of colors, two-dimensional and three-dimensional images, holograms, patterns, shapes, and transparency.

23. The refrigerator of claim 18, further comprising a display for computer access, video or audio connection.

24. The refrigerator of claim 18, further comprising a touch-sensitive surface integrated with opening, closing, or locking said door.

25. The refrigerator of claim 18, wherein said one or more storage compartments comprise at least one weight-sensitive scale linked to said perimeter scanning unit.

* * * * *